Patented Oct. 6, 1953

2,654,750

UNITED STATES PATENT OFFICE 2,654,750

PENICILLIN SALT OF AN AMINE

Harley W. Rhodehamel, Jr., Indianapolis, Ind., assignor to Eli Lilly and Company, Indianapolis, Ind., a corporation of Indiana No Drawing. Application February 13, 1952, Serial No. 271,444

2 Claims. (Cl. 260—239.1)

This invention relates to a novel penicillin salt and the preparation thereof.

I have discovered that 1-dimethylamino-2-(2'-benzyl-4'-chloro)-phenoxyethane or its salts can be combined with penicillin or its salts by neutralization or metathetical reactions to form a sparingly soluble penicillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The following examples illustrate the preparation of the novel salt of this invention:

Example 1

To 3 g. of a solution of penicillin (e. g. a commercial mixture of the several penicillins) dissolved in 30 ml. of amyl acetate are added 3 g. of 1-dimethylamino-2-(2'-benzyl-4'-chloro)-phenoxyethane dissolved in 50 ml. of amyl acetate. The mixture is cooled and stirred occasionally whereupon the 1-dimethylamino-2-(2'-benzyl-4'-chloro)-phenoxyethane salt of penicillin precipitates. The salt is isolated as by decantation or filtration, and dried in vacuo.

The salt is represented by the following formula in which P represents penicillin:

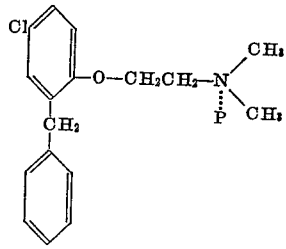

Example 2

To an aqueous solution of 0.3 g. of the potassium salt of penicillin G in 1.8 ml. of water is added a solution of 0.3 g. of 1-dimethylamino-2-(2'-benzyl-4'-chloro)-phenoxyethane hydrochloride in 10 ml. of water. The mixture is cooled and stirred occasionally whereupon the slightly soluble 1-dimethylamino-2-(2'-benzyl-4'-chloro)-phenoxyethane salt of penicillin G precipitates. The salt is separated, and dried in vacuo.

1-dimethylamino-2-(2'-benzyl-4'-chloro)-phenoxyethane can be prepared as follows: p-chlorophenol is condensed with benzyl chloride by the Claisen method to prepare 4-chloro-2-benzylphenol. The sodium salt of 4-chloro-2-benzylphenol is treated with dimethylaminoethylchloride in dry ether solution, whereupon 1-dimethylamino-2-(2'-benzyl-4'-chloro)-phenoxyethane is formed, and is recovered by the usual procedures, and purified by vacuum distillation. Acid addition salts of 1-dimethylamino-2-(2'-benzyl-4'-chloro)-phenoxyethane are prepared by the methods known to the art, as for example, by interreaction of equivalent amounts of the base and a selected acid in inert solvent solution, followed by removal of the solvent.

I claim:

1. The 1-dimethylamino-2-(2'-benzyl-4'-chloro)-phenoxyethane salt of penicillin represented by the following formula in which P represents penicillin:

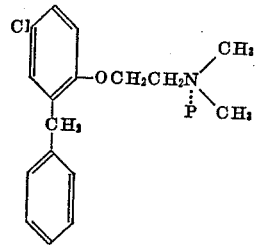

2. The 1-dimethylamino-2-(2'-benzyl-4'-chloro)-phenoxyethane salt of penicillin G.

HARLEY W. RHODEHAMEL, JR.

References Cited in the file of this patent

UNITED STATES PATENTS

| Number | Name | Date |
|---|---|---|
| 2,515,898 | Rhodehamel | July 18, 1950 |
| 2,547,782 | Rhodehamel | Apr. 3, 1951 |
| 2,578,537 | Granatek | Dec. 11, 1951 |